(12) United States Patent
O'Keeffe et al.

(10) Patent No.: US 11,603,299 B2
(45) Date of Patent: Mar. 14, 2023

(54) FORKLIFT

(71) Applicant: Palfinger AG, Bergheim bei Salzburg (AT)

(72) Inventors: Eric O'Keeffe, Monaghan (IE); Patrick Keenan, Alpharetta, GA (US); Matthias Kalin, Strasswalchen (AT)

(73) Assignee: PALFINGER AG, Bergheim Bei Salzburg (AT)

( * ) Notice: Subject to any disclaimer, the term of this patent is extended or adjusted under 35 U.S.C. 154(b) by 262 days.

(21) Appl. No.: 16/804,609

(22) Filed: Feb. 28, 2020

(65) Prior Publication Data
US 2020/0198949 A1    Jun. 25, 2020

Related U.S. Application Data

(63) Continuation of application No. PCT/EP2018/073211, filed on Aug. 29, 2018.

(30) Foreign Application Priority Data

Sep. 1, 2017   (EP) .................................... 17189038

(51) Int. Cl.
*B66F 9/075*    (2006.01)
*B60N 2/14*    (2006.01)
(Continued)

(52) U.S. Cl.
CPC .............. *B66F 9/0759* (2013.01); *B60N 2/14* (2013.01); *B60N 2/753* (2018.02); *B60R 21/02* (2013.01);
(Continued)

(58) Field of Classification Search
CPC .......... B60N 2/38; B60N 2/4235; B60N 2/14; B60N 2/143; B60N 2/146; B66F 9/0759;
(Continued)

(56) References Cited

U.S. PATENT DOCUMENTS 3,627,379 A * 12/1971 Faust ..................... B60N 2/986
297/284.3
4,241,893 A * 12/1980 Koutsky .................. B60N 2/14
296/65.14
(Continued)

FOREIGN PATENT DOCUMENTS

DE          199 32 256        1/2001
DE          202 02 522        8/2002
(Continued)

OTHER PUBLICATIONS

International Search Report dated Nov. 12, 2018 in International (PCT) Application No. PCT/EP2018/073211.

*Primary Examiner* — Gregory A Blankenship
(74) *Attorney, Agent, or Firm* — Wenderoth, Lind & Ponack, L.L.P.

(57) ABSTRACT

A forklift includes a cabin and a seat for use by a driver arranged in the cabin. The cabin has a lateral opening to enter and exit the cabin, and the seat is mounted rotatably relative to the cabin. There is a safety bracket for preventing the driver from involuntarily exiting the cabin through the lateral opening, and for providing lateral impact protection. The safety bracket is mechanically connected to the seat to be rotatable together with the seat.

10 Claims, 7 Drawing Sheets

(51) Int. Cl.
 *B60R 21/02*  (2006.01)
 *B60N 2/75*  (2018.01)
 *B66F 17/00*  (2006.01)
 *B60R 21/00*  (2006.01)
 *B66F 9/07*  (2006.01)

(52) U.S. Cl.
 CPC .... *B66F 17/003* (2013.01); *B60R 2021/0079* (2013.01); *B60R 2021/028* (2013.01); *B66F 9/07* (2013.01)

(58) Field of Classification Search
 CPC ........... B66F 17/003; B60R 2021/0079; B60R 2021/0074; B60R 2021/0081
 USPC .............................. 296/190.03, 65.06, 65.07
 See application file for complete search history.

(56) References Cited

U.S. PATENT DOCUMENTS

| | | | | |
|---|---|---|---|---|
| 4,262,958 | A * | 4/1981 | Houseman | B60N 2/14 296/65.13 |
| 4,537,446 | A | 8/1985 | Roney et al. | |
| 4,623,196 | A * | 11/1986 | Roney | B60N 2/4235 296/68.1 |
| 5,050,700 | A * | 9/1991 | Kim | B60R 21/02 280/801.1 |
| 5,894,905 | A * | 4/1999 | Abels | B66F 9/07545 180/282 |
| 5,938,237 | A * | 8/1999 | Abels | B60N 2/79 180/282 |
| 6,557,893 | B2 | 5/2003 | Sauermann | |
| 6,679,349 | B1 * | 1/2004 | Pollish, Jr. | B60N 2/24 180/326 |
| 6,752,422 | B2 | 6/2004 | Sauermann | |
| 6,902,024 | B2 * | 6/2005 | Müller | B66F 9/07545 180/271 |
| 6,955,239 | B2 * | 10/2005 | Ueda | B66F 9/0759 74/513 |
| 7,059,680 | B2 * | 6/2006 | Billger | B60N 2/919 297/344.21 |
| 7,121,608 | B2 * | 10/2006 | Billger | B60N 2/38 297/344.22 |
| 7,347,299 | B2 | 3/2008 | Billger et al. | |
| 7,434,863 | B2 * | 10/2008 | Hamazaki | B60N 2/146 297/344.21 |
| 7,520,567 | B2 * | 4/2009 | Billger | B60N 2/797 180/331 |
| 7,971,677 | B2 * | 7/2011 | Ekren | B60N 2/24 180/329 |
| 8,444,212 | B2 * | 5/2013 | Schroter | B66F 17/003 280/748 |
| 2001/0030074 | A1 | 10/2001 | Sauermarm | |
| 2002/0153713 | A1 * | 10/2002 | Fischer | B60R 21/232 280/730.2 |
| 2003/0127268 | A1 * | 7/2003 | Bares | B60R 21/02 180/268 |
| 2003/0136599 | A1 | 7/2003 | Sauermann | |
| 2006/0061122 | A1 * | 3/2006 | Billger | B66F 9/0759 296/65.07 |
| 2007/0074923 | A1 | 4/2007 | Billger et al. | |
| 2007/0261908 | A1 * | 11/2007 | Berger | B60R 7/043 180/326 |
| 2009/0195024 | A1 * | 8/2009 | Cott | E02F 3/3414 296/190.08 |
| 2010/0072801 | A1 * | 3/2010 | Adelsperger | B60N 2/797 297/344.21 |
| 2018/0171578 | A1 * | 6/2018 | Smekal | E02F 3/286 |

FOREIGN PATENT DOCUMENTS

| | | | | |
|---|---|---|---|---|
| GB | | 2 144 323 | 3/1985 | |
| WO | WO 2012/059117 | * | 5/2012 | ............... B60N 2/14 |

* cited by examiner

FORKLIFT

BACKGROUND OF THE INVENTION

The invention concerns a forklift. In forklifts, safety brackets known in the prior art are usually mounted on the cabin and have to be manually put into working position after entering the cabin. As this proves to be cumbersome to many drivers, sometimes the safety brackets are not engaged and there is no protection for the driver from lateral impact or for preventing the driver from involuntarily exiting the cabin through the lateral opening.

The purpose of the invention is to provide a forklift in which the safety bracket is automatically engaged without complicating entering and exiting the cabin.

SUMMARY OF THE INVENTION

The safety bracket is mechanically connected to the seat to be rotatable together with the seat. In this way, the safety bracket is automatically engaged in the working position of the seat but does not complicate entering and exiting the cabin because it rotates out of the way together with the seat. The provision of a door covering the lateral opening is not necessary but can be envisioned.

Rotation of the seat together with the safety bracket can take place with respect to a substantially vertical axis (in working position of the forklift), preferably around a single pivot.

In an embodiment of the invention, the safety bracket extends at least from a sitting surface of the seat to an upper end of a backrest of the seat in.

The seat is preferably rotatable between a first position, in which entry and exit of the cabin is facilitated, and a second position, in which the seat is oriented substantially in a forward driving position.

In a further embodiment, the seat is additionally rotatable into a third position suitable for rearward driving. In this way. neck strain on the driver can be eased.

A locking mechanism can be provided to releasably lock the seat and the safety bracket in the first and/or second— and/or if applicable third—position. Release of the locking mechanism can be e.g. effected by a lever to be operated by the driver.

In order to increase floor space, a sitting surface of the seat can taper in a direction away from a backrest of the seat.

It is possible to provide another safety bracket on the other side of the seat.

To increase comfort for the driver, an arm rest for the seat can be provided. If the arm rest is pivotally mounted to the seat and if the seat can be rotated to a third position suitably for rearward driving, seat rotation for rearward driving is permitted by pivoting the arm rest, e.g. by pushing the arm rest outward (i.e. away from the sitting surface of the seat). In this case, preferably the arm rest is mounted to pivot with respect to a substantially vertical axis.

In a preferred embodiment, the seat is rotated manually. However, there can be a rotation drive for rotating the seat.

The safety bracket could be mechanically coupled to the seat in a number of ways. For example, it could be mounted directly to a portion of the seat. However, it is preferred that the safety bracket is rigidly mounted to a mounting platform of the seat so that it rotates together with the seat. Of course, the mounting platform itself is rotatably mounted. In this case, there does not have to be a direct connection between seat and safety bracket because the mechanical coupling between seat and safety bracket is being effected by the mounting platform.

Rotation of the seat is mechanically biased by way of a spring device in one of the rotational directions. E.g. in the second position the spring device could bias the seat into the first position (entry and exit position). Upon release of the locking mechanism the force of the spring means can act on the seat and can at least support rotation of the seat into the first position. Depending on the spring device it could be provided that the spring device not only supports the rotational movement but pushes the seat into first position. In the first position there can be a stop provided so that a locking mechanism only has to be provided with respect to the second position although a locking mechanism can also be provided with respect to the first position. Of course, the locking mechanism can be provided irrespective of the fact whether there is a spring device or not.

Although it is preferred that the safety bracket is rigidly coupled to the seat, it is possible that the safety bracket is pivotally mounted with respect to the seat.

Although the invention is applicable to all types of forklift, a preferred example of a forklift is a truck-mounted forklift.

BRIEF DESCRIPTION OF THE DRAWINGS

Embodiments of the invention are shown in an exemplary way in the figures:

FIG. 3b is a top view with respect to FIG. 3a;

FIG. 4b is a top view with respect to FIG. 4a;

DETAILED DESCRIPTION OF THE INVENTION

Figure 1:
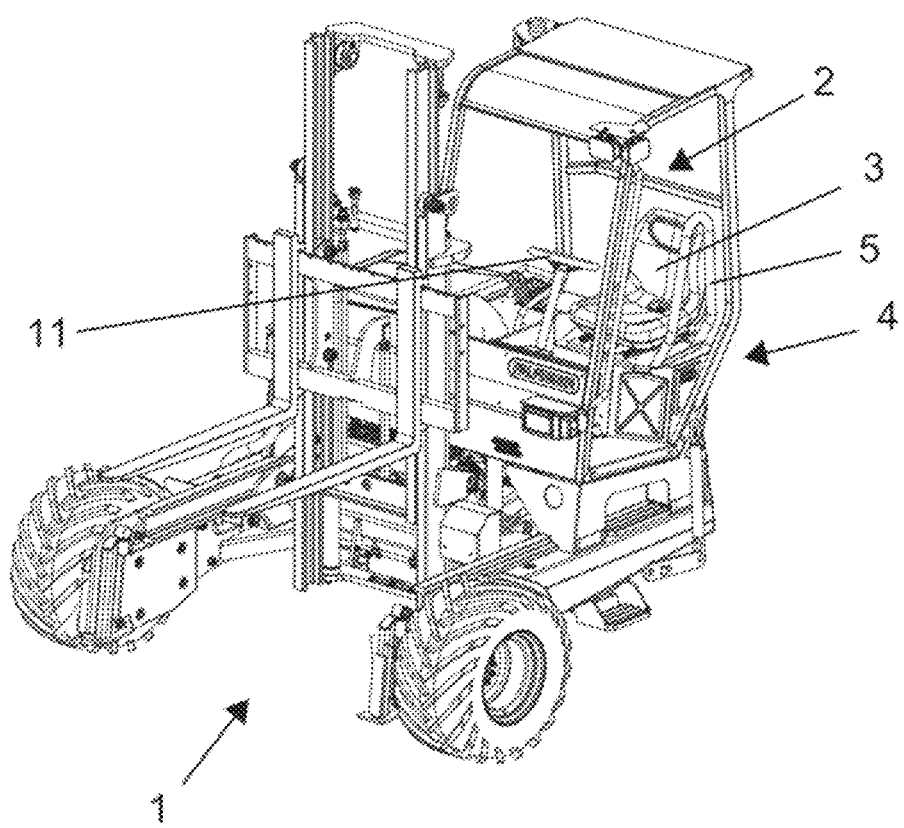
FIG. 1 shows a forklift according to the invention in perspective view.
Figure 2:
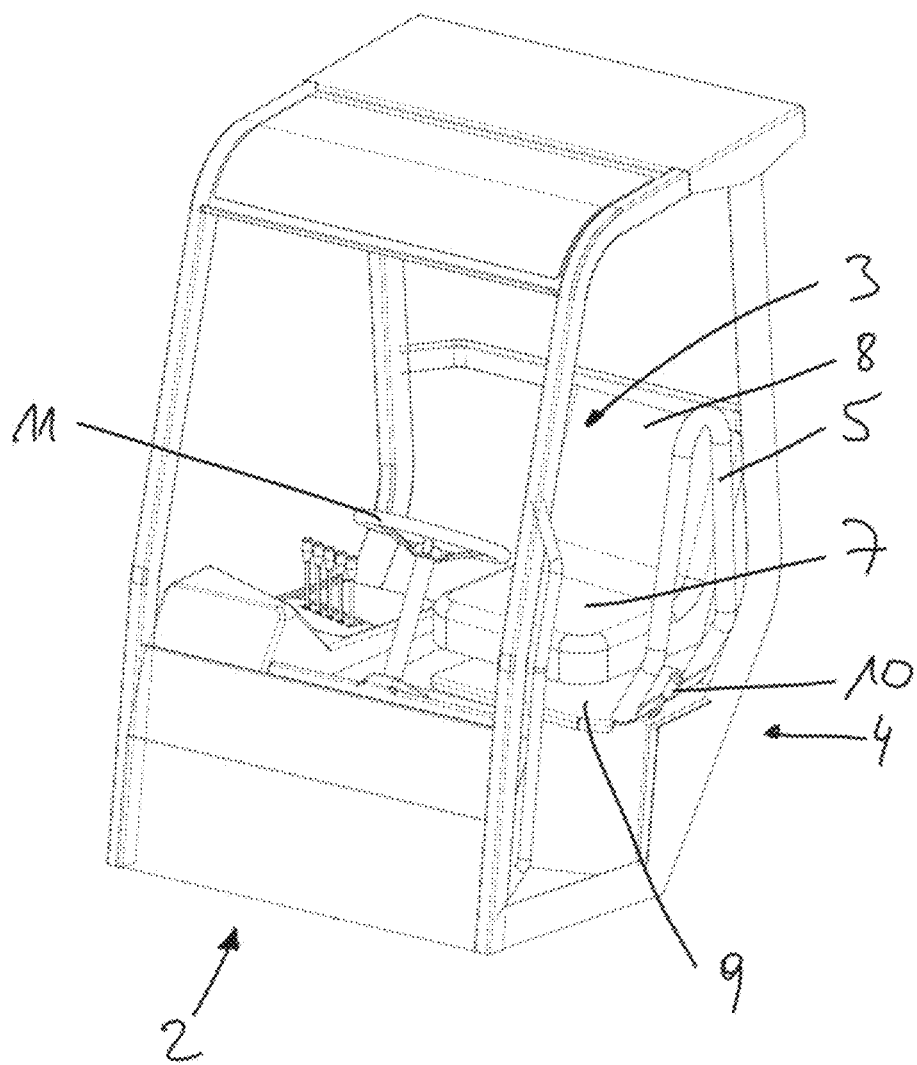
FIG. 2 shows the cabin of the forklift of FIG. 1 in isolated view with the seat in forward driving position.
Figure 3A:
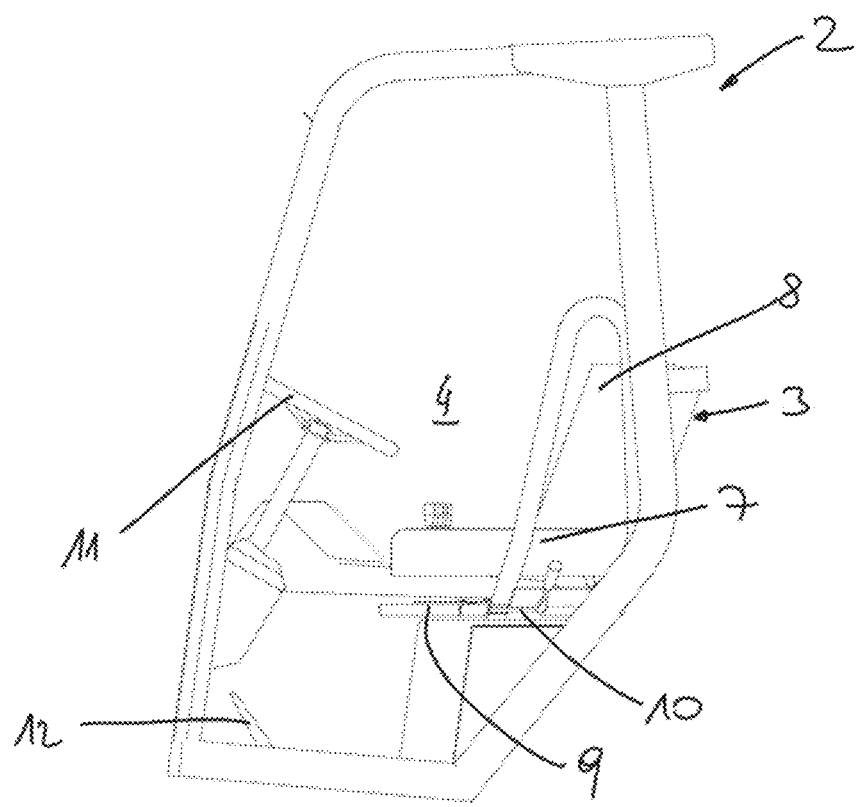
FIG. 3a shows the cabin in side view with the seat in entry position.
Figure 3B:
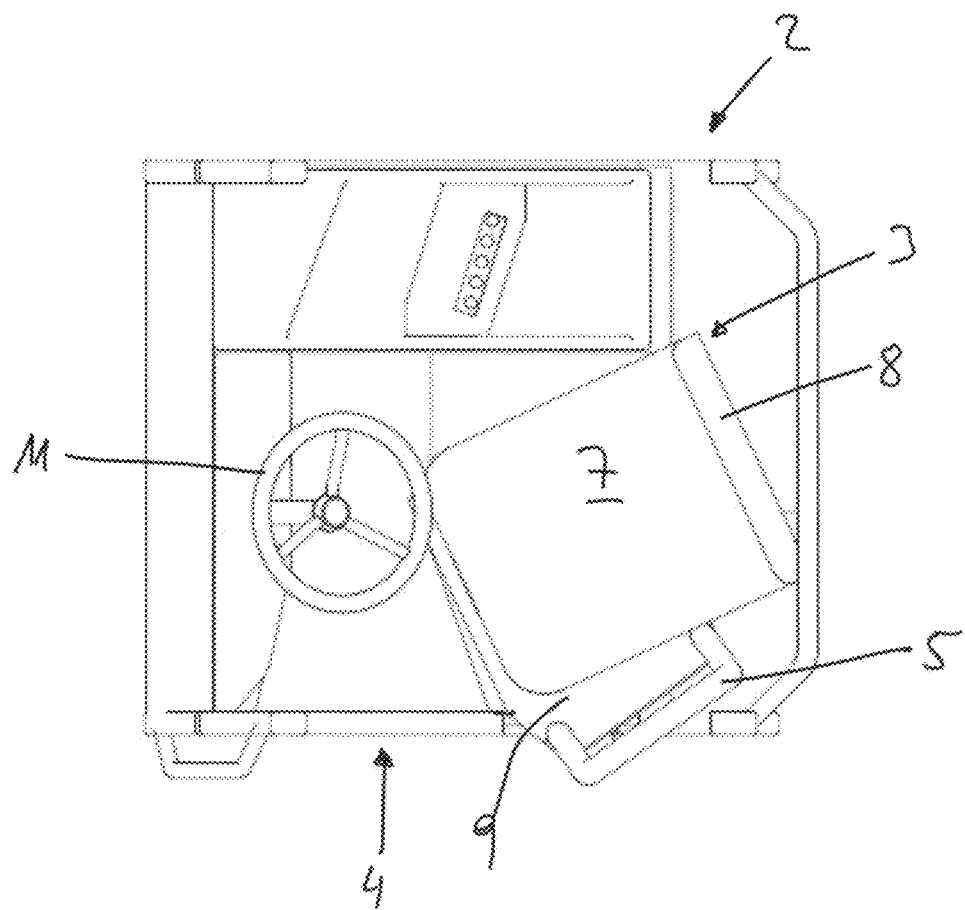
Figure 4A:
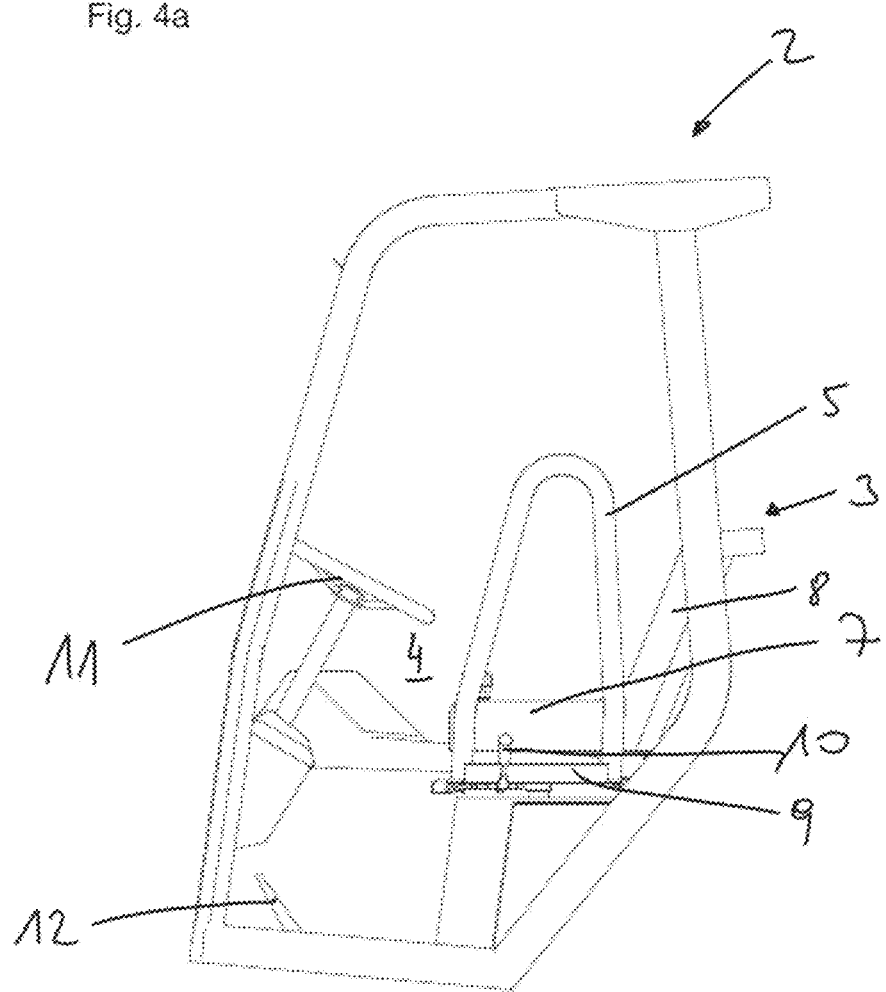
FIG. 4a shows the cabin in side view with the seat in forward driving position.
Figure 4B:
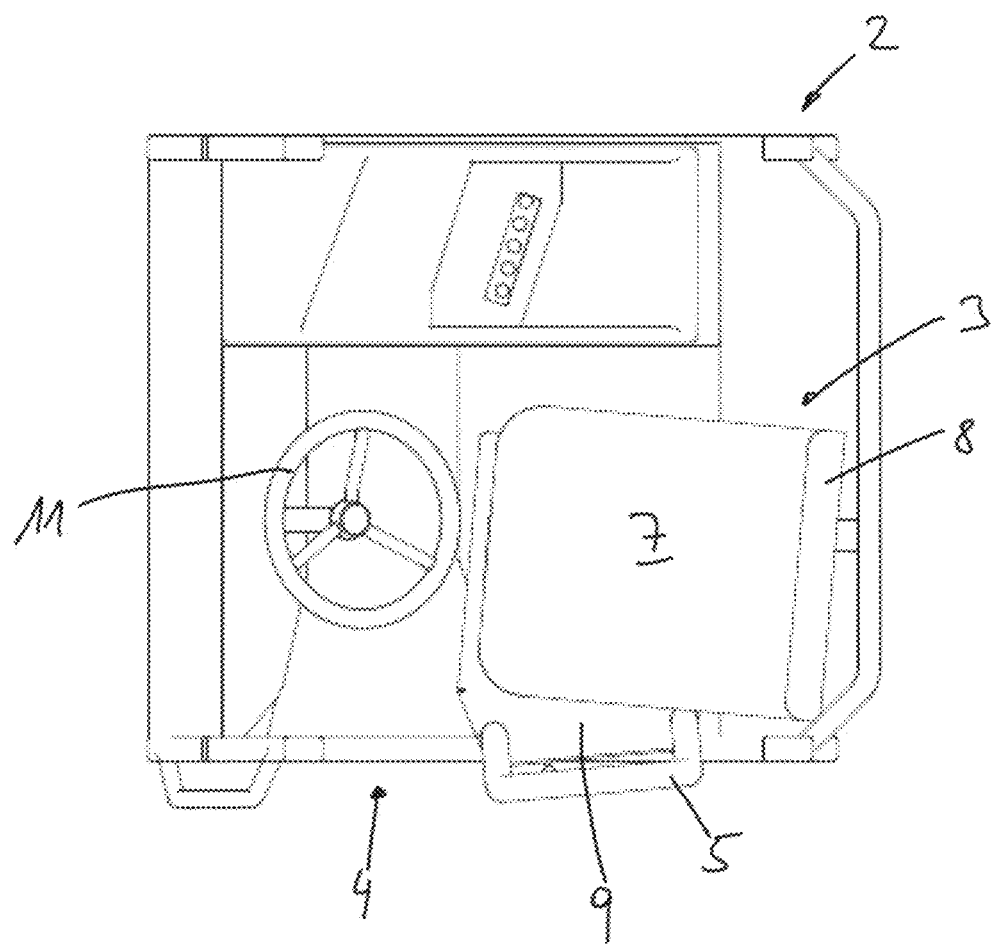

The figures show a truck-mounted forklift 1 having a cabin 2 and a seat 3 for use by a driver arranged in the cabin 2.

The cabin 2 has a lateral opening 4 to enter and exit the cabin 2. The seat 3 is mounted rotatably relative to the cabin 2.

There is provided a safety bracket 5 for preventing a driver from involuntarily exiting the cabin 2 through the lateral opening 4 and for providing lateral impact protection. According to the invention the safety bracket 5 is mechanically connected to the seat 3 to be rotatable together with the seat 3. The safety bracket 5 can be used as a handgrab by the driver when entering the cabin 2.

The safety bracket 5 rotates together with the seat 3 in an upright position. The safety bracket 5 extends from the sitting surface 7 of the seat 3, or more specifically from the seat mounting frame 9 under the seat 3, to an upper end of the backrest 8 of the seat 3 and in the shown embodiment extends for a distance beyond the upper end of the backrest 8.

In the shown embodiment mechanical coupling is being done by rigidly mounting both the seat 3 and the safety bracket 5 on a mounting frame 9 (with the possible exception of slidably moving the seat 3 along the mounting frame 9 in order to adjust distance between seat 3 and a forward end of the cabin 2 where driving controls are arranged, however the safety bracket 5 does not have to be slidably mounted to the mounting frame 9). The mounting frame 9 is rotatable relative to the cabin 2 and can be releasably locked by a locking mechanism in two different positions:

- a first position in which entry and exit of the cabin 2 is facilitated
- a second position in which the seat 3 is oriented substantially in a forward driving position looking towards a driving wheel 11 and pedals 12 (note that in the shown embodiment the forward driving position the seat 2 is oriented with an angle about 5° relative to the forward driving direction of the forklift 1).

It would also be feasible to provide a third position in which the seat 3 is oriented suitable for rearward driving.

In an alternative embodiment, the seat 3 and the safety bracket 5, which are mechanically connected, part rotatably to the mounting frame 9.

In the shown embodiment the seat 3 has to be rotated by the driver without support by a rotation drive except for a spring device which biases the mounting frame 9 in rotation direction from the second to the first position. A release lever 10 releases a locking mechanism which locks rotation of the mounting frame 9 in the first and second position. The locking mechanism can comprise a cam that can be swivelled against the force of a spring by the release lever 10. In the shown embodiment the release lever 10 is arranged on the left side of the seat 3 (cf. FIG. 5*a*) although it could be positioned elsewhere. The shown placement minimizes danger of accidentally opening the locking mechanism. By way of example, to release the seat 3 in the second position it has to be pushed rearward to be rotatable into the first position (rearward motion to enable outward rotation is a natural movement for a driver). A release of the seat 3 in the second position by pushing the release lever 10 in the opposite, forward position for the seat 3 to be rotatable into the first position can also be envisioned.

Figure 5A:
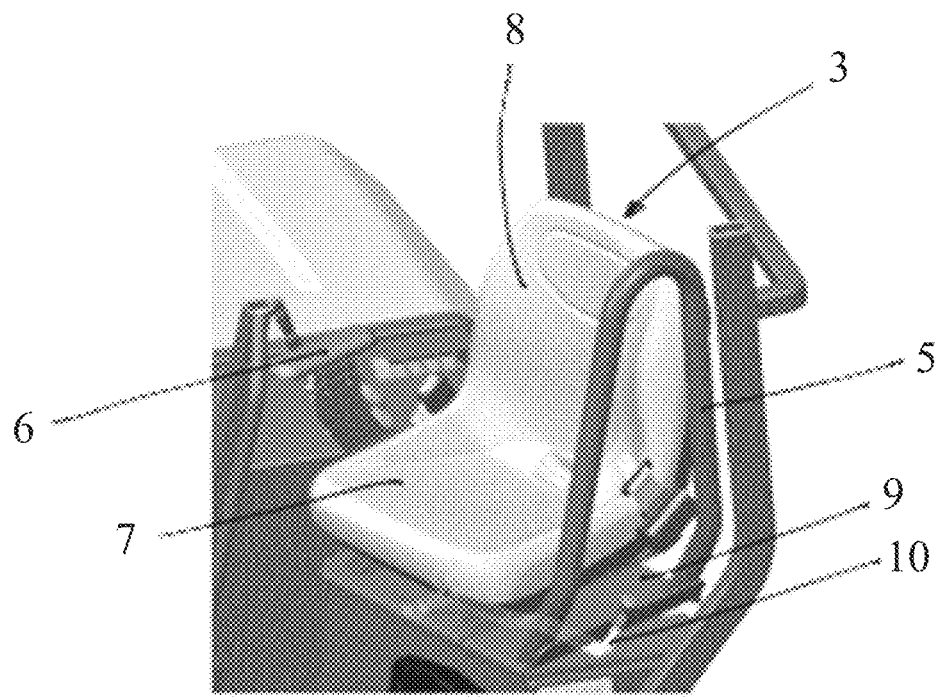
FIG. 5a shows the seat in an isolated view from the front of the forklift.
Figure 5B:
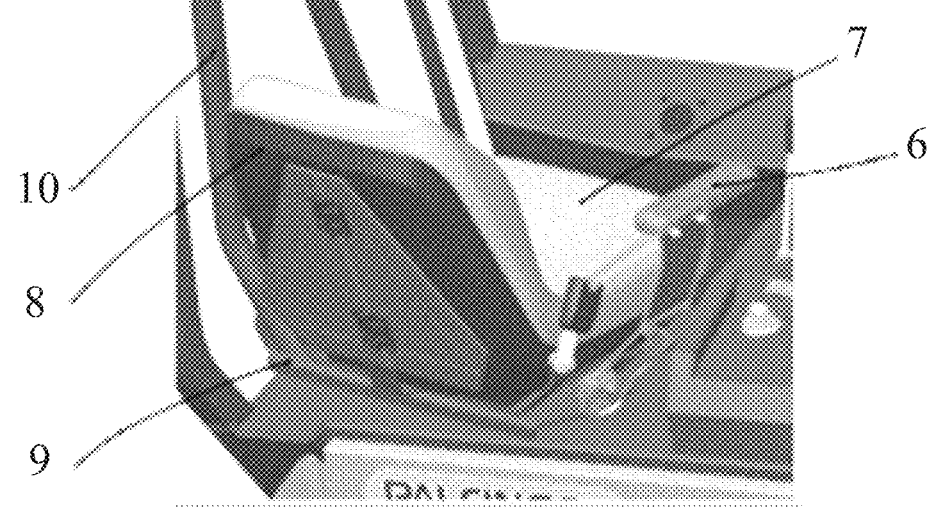
FIG. 5b shows the seat in an isolated view from the rear of the forklift.

To increase comfort for the driver there is provided an arm rest 6 for the seat 3 (cf. FIG. 5*b*). The arm rest 6 is pivotally mounted to the seat 3. In FIG. 5*b* rotation of the seat 3 into a third position for rearward driving is permitted by pivoting the arm rest 6 (in the shown embodiment by pushing the arm rest 6 outward, i.e. away from the sitting surface 7 of the seat 3).

As shown in FIGS. 5*a* and 5*b* the seat 3 can be provided with a seat belt.

There might be provided a sensor detecting the swivel position of the seat 3 in order to only allow driving of the forklift 1 if the seat 3 is in forward driving position.

LIST OF REFERENCE SIGNS

1 forklift
2 cabin
3 seat
4 lateral opening
5 safety bracket
6 arm rest
7 sitting surface of seat
8 backrest of seat
9 mounting platform of seat
10 release lever
11 driving wheel
12 pedal

The invention claimed is:

1. A forklift comprising:
   a cabin having a lateral opening through which to enter and exit the cabin;
   a seat for use by a driver arranged in the cabin, wherein the seat is mounted rotatably relative to the cabin; and
   a safety bracket for preventing the driver from involuntarily exiting the cabin through the lateral opening and for providing lateral impact protection,
   wherein the safety bracket is mechanically connected to the seat so as to be rotatable together with the seat, and
   wherein the seat and safety bracket are jointly rotatable with respect to a substantially vertical axis such that the seat is rotatable between a first position in which the safety bracket is positioned so as to facilitate entry to and exit from the seat in the cabin, and a second position in which the seat is oriented substantially in a forward driving position and the safety bracket is positioned so as to prevent the driver from involuntarily exiting the cabin through the lateral opening; and
   wherein the safety bracket extends at least from a sitting surface of the seat to an upper end of a backrest of the seat.

2. The forklift according to claim 1, wherein in the forward driving position, the seat is oriented at an angle of between 3° and 9° relative to a forward driving direction of the forklift.

3. The forklift according to claim 2, wherein in the forward driving position, the seat is oriented at an angle of 5° relative to the forward driving direction.

4. The forklift according to claim 2, wherein the seat is rotatable into a third position suitable for rearward driving.

5. The forklift according to claim 1, further comprising at least one arm rest for the seat.

6. The forklift according to claim 1, further comprising a locking mechanism for releasably locking rotation of the seat in at least one position.

7. The forklift according to claim 6, further comprising a release device for releasing the locking mechanism and allowing rotation of the seat.

8. The forklift according to claim 1, wherein the safety bracket is rigidly mounted to a mounting platform of the seat.

9. The forklift according to claim 1, wherein the forklift is a truck-mounted forklift.

10. The forklift according to claim 1, wherein the safety bracket extends from a rear end of the seat to a front end of the seat.

* * * * *